Patented June 22, 1948

2,443,844

UNITED STATES PATENT OFFICE 2,443,844

LIGHT SENSITIVE BLUEPRINT MATERIAL AND PROCESS OF MANUFACTURING THE SAME

Matheus Marinus Paulus Vallen and Jan Matheus Henricus van den Dolder, Venlo, Netherlands, assignors to Chemische Fabriek L. van der Grinten, Venlo, Netherlands, a company of the Netherlands No Drawing. Application September 23, 1946, Serial No. 698,872. In the Netherlands January 13, 1941

Section 1, Public Law 690, August 8, 1946
Patent expires January 13, 1961

13 Claims. (Cl. 95—7)

For improving the keeping quality of blueprint papers various means are known, for instance the addition of oxidizing substances such as chromates and the like, and of salts, such as oxalates and citrates. In general, oxidation agents decrease the printing-speed, some of them especially when the blueprint paper has a low moisture content. Oxalates worsen the fading of the blueprints when these have been insufficiently rinsed.

It has now been found that fluorides considerably ameliorate the keeping of sensitive layers for the negative blueprinting process, and that compared with chromates they only slightly influence the printing speed and do not worsen the fading. Fluorides that can be used effectively pursuant hereto include those which liberate fluorine ions in aqueous solutions or which form complex compounds with the ferric salts contained in the light sensitive layer of the blueprint paper, for example: sodium fluoride, potassium fluoride, ammonium fluoride, potassium bifluoride. Fluorides which are not capable of entering into reaction with the sensitive layer, for instance sodium- or potassium borofluoride, are either inactive or of reduced activitiy.

Of course, care is exercised to the end that the fluoride ions be not introduced into the blueprint paper along with cations exerting an unfavorable influence on the blueprint preparation. As examples of fluorides containing such cations may be mentioned zinc fluoride, which causes the formation of insoluble zinc ferri cyanides; calcium fluoride, which precipitates oxalates; stanno fluoride, which exerts a strong reducing action; ferri fluoride, which introduces free ferri-ions into the preparation; etc.

Preferably, the blueprint layer is provided with the fluoride by previously treating the face of the base material, for instance the base-paper, with a solution of the fluoride. The fluoride exerts a favorable influence also when the back of the base paper is treated with a solution of it, and when the fluoride is mixed with the blueprint chemical preparation itself before that preparation is applied to the paper base. The three treatments mentioned, that is to say, preparation of the back, previous preparation of the face and incorporation into the blueprint chemical preparation, may be combined to advantage.

When the fluoride is incorporated with the blueprint coating solution with which the base paper is sensitized, the amount of fluoride will preferably be chosen not larger than 5%, calculated on the solution. The percentage of fluoride based on the weight of all the other blueprinting chemicals contained by the paper should be between 2% and 20%. Larger amounts of fluoride damage the color of the finished print and they also reduce the printing speed appreciably. The same applies to previously coating the base paper with a fluoride solution; the concentration of such a solution should preferably not exceed 5%. Higher fluoride concentrations may be applied if desired in preparing the back of the material, because in that case only a small proportion of the fluoride enters into direct contact with the sensitive layer. Hence, in the latter case the effect of the fluoride is smaller than in the two other cases indicated above.

The fluoride may be used with particular advantage pursuant hereto in conjunction with blueprint coating solutions that do not keep very well. Among the most important examples of such blueprint coatings of low keeping capacity are those which contain potassium ferro cyanide. These coatings are often buffered by means of substances known for this purpose. In such buffered layers, too, fluorides cause a considerable improvement of keeping quality.

Paper that already has been stabilized to a large extent by means of oxidation agents is made better keeping by the addition of a fluoride as herein disclosed.

When a fluoride is used for pre-coating the blueprint material, it may be combined advantageously with other desired pre-coatings, such as a coating of baryte milk ($BaSO_4$) or the like.

The use of fluorides as herein disclosed has some, though a feeble, effect upon the shade of the blue of the blueprints. As far as this blue has a somewhat greenish tinge, it is shaded to a somewhat purer blue by the addition of a fluoride.

*Example 1*

A base paper is pre-coated with a 1% aqueous solution of sodium fluoride and then is coated with a solution of 40 grs. of ferri ammonium oxalate,
7 grs. of potassium oxalate,
5 grs. of potassium ferricyanide,
6 grs. of potassium ferrocyanide, and
1.5 grs. of sodium fluoride in
200 cubic cms. of water.

The blueprint paper thus obtained keeps considerably better than paper made similarly without either the described precoating or the addition of a fluoride to the coating solution.

Similar differences in result are obtained when 3 grs. of borax are added to the coating solution.

The addition of the fluoride has hardly an appreciable effect upon the printing speed of the blueprint paper.

*Example 2*

A base paper is pre-coated with a 1½% aqueous solution of sodium fluoride and then coated with a solution of:

34 grs. of ferri ammonium oxalate,
6 grs. of potassium oxalate,
2 grs. of oxalic acid, and
6 grs. of potassium ferricyanide in
200 cubic cms. of water.

The blueprint paper thus obtained keeps considerably better than paper made in the same way without the described pre-coating, and the pre-coating has hardly an appreciable effect on the printing speed of the blueprint paper.

*Example 3*

One surface of a base paper is coated with a 5% aqueous solution of sodium fluoride and the other surface is coated with a solution of 34 grs. of ferri ammonium oxalate,
7.5 grs. of potassium oxalate,
2 grs. of oxalic acid,
4 grs. of sodium citrate,
1 gr. of potassium ferrocyanide,
5.5 grs. of potassium ferricyanide, and
0.4 gr. of gelatine in
200 cubic cms. of water.

The blueprint paper thus obtained has better keeping qualities than paper made similarly without the back-coating, and the back-coating has hardly an appreciable effect upon the printing speed of the blueprint paper.

What we claim is:

1. Sensitized blueprint material for the negative blueprinting process, comprising a light-sensitive layer containing a ferric salt and at least one compound selected from the group consisting of water-soluble ferro- and ferri-cyanides, and in contact with said layer a fluoride capable of liberating fluorine ions in aqueous solution, to enhance the keeping quality of said layer.

2. Sensitized blueprint material for the negative blueprinting process, comprising sheet material impregnated on the same side with a base coating containing a fluoride capable of liberating fluorine ions in aqueous solution and with a superposed coating of a blueprint preparation containing a light-sensitive ferric salt and at least one compound selected from the group consisting of water-soluble ferro- and ferri-cyanides, said fluoride enhancing the keeping quality of the material.

3. Sensitized blueprint material for the negative blueprinting process, comprising sheet material impregnated with a blueprint preparation containing light-sensitive ferric salt and at least one compound selected from the group consisting of water-soluble ferro- and ferri-cyanides, together with a fluoride capable of liberating fluorine ions in aqueous solution, to enhance the keeping quality of said material.

4. Sensitized blueprint material for the negative blueprinting process, comprising sheet material impregnated on one side with a blueprint preparation containing a light-sensitive ferric salt and at least one compound selected from the group consisting of water-soluble ferro- and ferri-cyanides, and impregnated on the other side with a fluoride capable of liberating fluorine ions in aqueous solution, to enhance the keeping quality of said preparation.

5. Sensitized blueprint material for the negative blueprinting process, comprising a light-sensitive layer containing a ferric salt and a water soluble ferro-cyanide, and in contact with said layer a fluoride capable of liberating fluorine ions in aqueous solution, to enhance the keeping quality of said layer.

6. Sensitized blueprint material for the negative blueprinting process, comprising a light-sensitive layer containing a ferric salt and a water soluble ferri-cyanide, and in contact with said layer a fluoride capable of liberating fluorine ions in aqueous solution, to enhance the keeping quality of said layer.

7. Sensitized blueprint material for the negative blueprinting process, comprising a paper base impregnated with a blueprint preparation containing a light-sensitive ferric salt and at least one compound selected from the group consisting of water-soluble ferro- and ferri-cyanides, and impregnated also with a fluoride capable of liberating fluorine ions in aqueous solution, to enhance the keeping quality of said material.

8. Sensitized blueprint material for the negative blueprinting process, comprising a paper base impregnated with a blueprint preparation containing a light-sensitive ferric salt, a water soluble ferric-cyanide and a water soluble ferro-cyanide, and impregnated also with sodium fluoride to enhance the keeping quality of said preparation.

9. A process for producing sensitized negative blueprint material, which comprises impregnating absorbent sheet material with a blueprint preparation containing a light-sensitive ferric salt and at least one compound selected from the group consisting of water-soluble ferro- and ferri-cyanides, and providing in said material a fluoride capable of liberating fluorine ions in aqueous solution, to enhance the keeping quality of said preparation.

10. A process for producing sensitized negative blueprint material which comprises precoating absorbent sheet material with an aqueous solution of a fluoride capable of liberating fluorine ions in aqueous solution and then applying over the precoating a solution of a blueprint preparation containing a light-sensitive ferric salt and at least one compound selected from the group consisting of water-soluble ferro- and ferri-cyanides, said fluoride acting to enhance the keeping quality of said preparation.

11. A process for producing sensitized negative blueprint material, which comprises applying to the face of a paper base an aqueous solution of a blueprint preparation containing a light-sensitive ferric salt and at least one compound selected from the group consisting of water-soluble ferro- and ferri-cyanides, and applying to the back of said base an aqueous solution of a fluoride capable of liberating fluorine ions in aqueous solution, to enhance the keeping quality of said preparation.

12. A sensitizing solution for the manufacture of sensitized negative blueprint material, comprising an aqueous solution of a light-sensitive ferric salt, at least one compound selected from the group consisting of water-soluble ferro- and ferri-cyanides, and a fluoride capable of liberating fluorine ions in aqueous solution, to enhance the keeping quality of the composition.

13. A sensitizing solution for the manufacture of sensitized negative blueprint material, comprising an aqueous solution of a light-sensitive ferric salt, alkali metal ferricyanide, alkali metal ferrocyanide, and sodium fluoride.

MATHEUS MARINUS PAULUS VALLEN.
JAN MATHEUS HENRICUS V. D. DOLDER.

REFERENCES CITED

The following references are of record in the file of this patent:

UNITED STATES PATENTS

| Number | Name | Date |
|---|---|---|
| 2,126,504 | Reynolds | Aug. 9, 1938 |
| 2,205,991 | Neugebauer et al. | June 25, 1940 |

FOREIGN PATENTS

| Number | Country | Date |
|---|---|---|
| 54,925 | Netherlands | June 16, 1943 |